(12) United States Patent
Rieder et al.

(10) Patent No.: US 12,174,212 B2
(45) Date of Patent: Dec. 24, 2024

(54) CORIOLIS MASS FLOW METER

(71) Applicant: Endress+Hauser Flowtec AG, Reinach (CH)

(72) Inventors: Alfred Rieder, Landshut (DE); Robert Lalla, Lörrach (DE); Rémy Scherrer, Oberdorf (FR)

(73) Assignee: Endress+Hauser Flowtec AG, Reinach (CH)

( * ) Notice: Subject to any disclaimer, the term of this patent is extended or adjusted under 35 U.S.C. 154(b) by 185 days.

(21) Appl. No.: 17/414,449

(22) PCT Filed: Nov. 21, 2019

(86) PCT No.: PCT/EP2019/082037
§ 371 (c)(1),
(2) Date: Jun. 16, 2021

(87) PCT Pub. No.: WO2020/126282
PCT Pub. Date: Jun. 25, 2020

(65) Prior Publication Data
US 2022/0099543 A1 Mar. 31, 2022

(30) Foreign Application Priority Data
Dec. 20, 2018 (DE) ...................... 10 2018 133 116.9

(51) Int. Cl.
*G01F 1/84* (2006.01)
*G01N 9/36* (2006.01)

(52) U.S. Cl.
CPC ............ *G01N 9/36* (2013.01); *G01F 1/8422* (2013.01); *G01F 1/8427* (2013.01); *G01F 1/8431* (2013.01)

(58) Field of Classification Search
CPC ........ G01N 9/36; G01F 1/8422; G01F 1/8427
(Continued)

(56) References Cited

U.S. PATENT DOCUMENTS

| | | |
|---|---|---|
| 9,261,393 B2 | 2/2016 | Huber et al. |
| 10,928,233 B2 | 2/2021 | Bitto et al. |

(Continued)

FOREIGN PATENT DOCUMENTS

| | | |
|---|---|---|
| CN | 1934425 A | 3/2007 |
| CN | 101903754 A | 12/2010 |

(Continued)

*Primary Examiner* — Alexander A Mercado
*Assistant Examiner* — Rodney T Frank
(74) *Attorney, Agent, or Firm* — Christopher R. Powers; Endress+Hauser (USA) Holding, Inc.

(57) ABSTRACT

A Coriolis mass flow meter comprises a transformer circuit configured to receive and analyze vibration measurement signals to determine mass flow measurement values which represent a mass flow of a fluid and to determine characteristic number values for at least one sensor characteristic number, which characterizes and/or is based on at least one harmonic component of at least one of the vibration measurement signals, wherein each vibration measurement signal includes a useful component, having a frequency corresponding to a drive frequency with an amplitude based on a respective magnetic flux through a respective vibration sensor of the flow meter, and a harmonic component having a frequency corresponding to a whole-number multiple of the drive frequency and an amplitude based on the respective magnetic flux.

19 Claims, 6 Drawing Sheets

(58) Field of Classification Search
USPC .......................................................... 73/32 A
See application file for complete search history.

(56) References Cited

U.S. PATENT DOCUMENTS

| | | |
|---|---|---|
| 2007/0006666 A1 | 1/2007 | Henry |
| 2011/0072912 A1 | 3/2011 | Loving |
| 2013/0055827 A1 | 3/2013 | Bierweiler et al. |
| 2017/0186686 A1 | 6/2017 | Liu et al. |
| 2018/0143064 A1 | 5/2018 | Kunze et al. |

FOREIGN PATENT DOCUMENTS

| | | |
|---|---|---|
| CN | 102483341 A | 5/2012 |
| CN | 102652253 A | 8/2012 |
| CN | 108072411 A | 5/2018 |
| DE | 3505166 A1 | 8/1986 |
| DE | 102012201592 B3 | 3/2013 |
| DE | 102015120087 A1 | 5/2017 |
| DE | 102016122241 A1 | 5/2018 |
| EP | 0275367 A2 | 7/1988 |
| EP | 0462711 A1 | 5/1991 |
| EP | 0803713 A1 | 10/1997 |
| WO | 2006122881 A2 | 11/2006 |
| WO | 2018121930 A1 | 7/2018 |

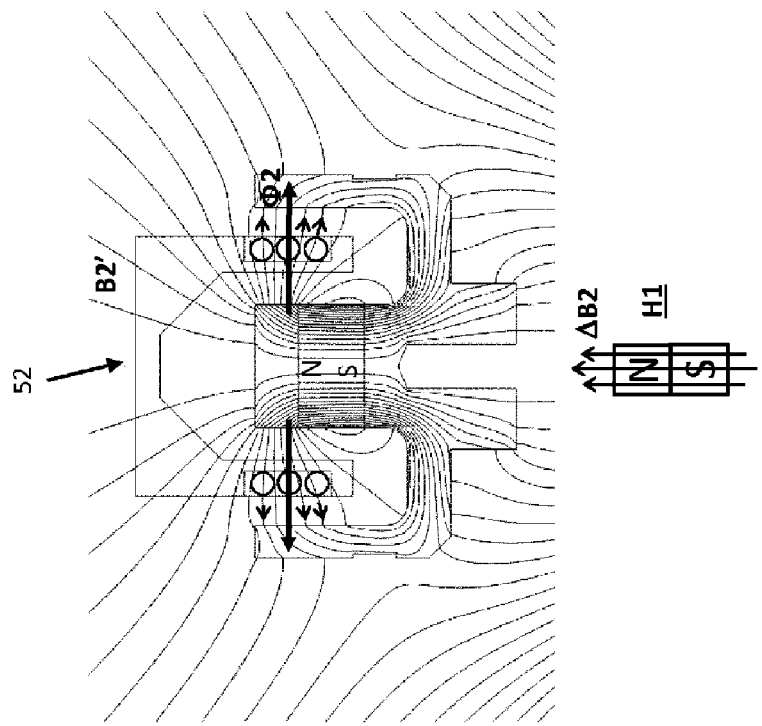
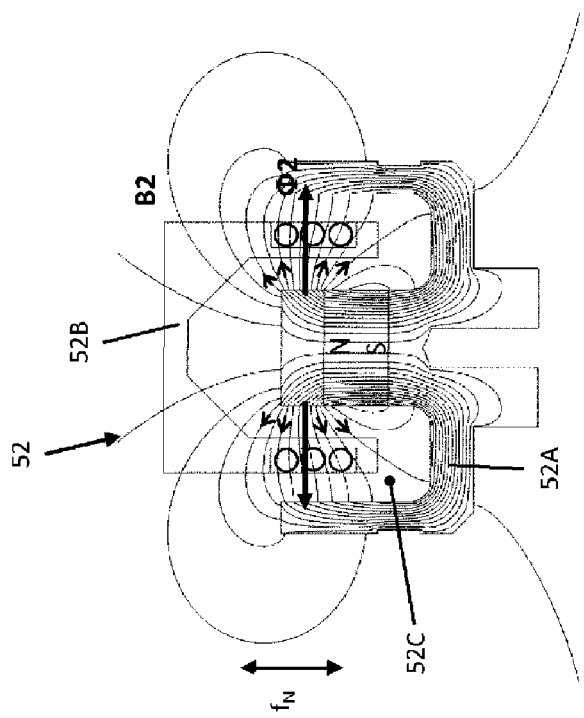
*Fig. 5b*
*Fig. 5a*

CORIOLIS MASS FLOW METER

CROSS-REFERENCE TO RELATED APPLICATIONS

The present application is related to and claims the priority benefit of German Patent Application No. 10 2018 133 116.9, filed on Dec. 20, 2018, and International Patent Application No. PCT/EP2019/082037, filed on Nov. 21, 2019, the entire contents of which are incorporated herein by reference.

TECHNICAL FIELD

The invention relates to a Coriolis mass flow meter for measuring a mass flow of a fluid substance to be measured.

BACKGROUND

In industrial measurement technology, especially also in connection with the regulation and monitoring of automated process-engineering processes, Coriolis mass flow meters are used for the highly accurate determination of one or more measurement variables, for example a mass flow and/or a density, of a substance to be measured, for example a liquid, a gas or a dispersion, flowing in a process line, for example a pipe, and are often formed by means of a transformer circuit, usually formed by means of at least one microprocessor, and a measuring transducer of the vibration type, which is electrically connected to said transformer circuit and through which the substance to be measured flows during operation. Examples of such Coriolis mass flow meters, for example also in the form of density meters and/or viscosity meters, are described, inter alia, in EP-A 564 682, EP-A 816 807, US-A 2002/0033043, US-A 2006/0096390, US-A 2007/0062309, US-A 2007/0119264, US-A 2008/0011101, US-A 2008/0047362, US-A 2008/0190195, US-A 2008/0250871, US-A 2010/0005887, US-A 2010/0011882, US-A 2010/0257943, US-A 2011/0161017, US-A 2011/0178738, US-A 2011/0219872, US-A 2011/0265580, US-A 2011/0271756, US-A 2012/0123705, US-A 2013/0042700, US-A 2016/0071639, US-A 2016/0313162, US-A 2016/0187176, US-A 2017/0003156, US-A 2017/0261474, US-A 44 91 009, U.S. Pat. Nos. 4,756,198, 4,777,833, 4,801,897, 4,876,898, 4,996,871, 5,009,109, 5,287,754, 5,291,792, 5,349,872, 5,705,754, 5,796,010, 5,796,011, 5,804,742, 5,831,178, 5,945,609, 5,965,824, 6,006,609, 6,092,429, 6,223,605, 6,311,136, 6,477,901, 6,505,518, 6,513,393, 6,651,513, 6,666,098, 6,711,958, 6,840,109, 6,883,387, 6,920,798, 7,017,424, 7,040,181, 7,077,014, 7,143,655, 7,200,503, 7,216,549, 7,296,484, 7,325,462, 7,360,451, 7,665,369, 7,792,646, 7,954,388, 8,201,460, 8,333,120, 8,695,436, WO-A 00/19175, WO-A 00/34748, WO-A 01/02812, WO-A 01/02816, WO-A 01/71291, WO-A 02/060805, WO-A 2005/050145, WO-A 2005/093381, WO-A 2007/043996, WO-A 2008/013545, WO-A 2008/059262, WO-A 2009/148451, WO-A 2010/099276, WO-A 2013/092104, WO-A 2014/151829, WO-A 2016/058745, WO-A 2017/069749, WO-A 2017/123214, WO-A 2017/137347, WO-A 2017/143579, WO-A 2018/160382, WO-A 2018/174841, WO-A 85/05677, WO-A 88/02853, WO-A 88/03642, WO-A 89/00679, WO-A 94/21999, WO-A 95/03528, WO-A 95/16897, WO-A 95/29385, WO-A 95/29386, WO-A 98/02725, WO-A 99/40 394, WO-A 2018/028932, WO-A 2018/007176, WO-A 2018/007185 or the German patent application DE102018102831.8, which has not been previously published.

The measuring transducer of each of the Coriolis mass flow meters shown in said documents comprises at least one vibration element, which is typically designed as a measurement tube that is straight at least in some section and/or is curved, for example U-, V-, S-, Z- or Ω-shaped at least in some sections and has a lumen surrounded by a tube wall for conducting the substance to be measured, or, as is also shown in WO-A 2018/160382, US-A 2016/0187176 or the aforementioned patent application DE102018102831.8, can also be designed for example as a displacement element that is positioned inside a lumen of a tube through which the substance to be measured flows. The at least one vibration element is configured to be in contact with the substance to be measured, for example such that the substance to be measured flows through and/or around it, and to be vibrated during this, especially in such a way that it carries out useful vibrations, namely mechanical vibrations around a rest position, at a useful frequency also determined by the density of the medium and consequently usable as a measure of the density. In conventional Coriolis mass flow meters, not least those with a vibration element designed as a measurement tube, bending vibrations at a natural resonant frequency are typically used as useful vibrations, for example bending vibrations that correspond to a natural bending vibration fundamental mode that is intrinsic to the measuring transducer and in which the vibrations of the vibration element are those resonance vibrations that have precisely one vibration loop. In addition, with a measurement tube that is curved at least in some sections as a vibration element, the useful vibrations are typically designed in such a way that said measurement tube oscillates about an imaginary vibration axis connecting an inlet-side and an outlet-side end of the measurement tube in the manner of a cantilever clamped at one end, whereas in the case of measuring transducers having a straight measurement tube as the vibration element, the useful vibrations are mostly bending vibrations in a single imaginary vibration plane.

It is also known to excite the at least one vibration element occasionally to forced, long-lasting, non-resonant vibrations, for example to perform recurrent checks of the measuring transducer during operation of the meter, or else to allow free damped vibrations of the at least one vibration element and to evaluate said free damped vibrations, in order, for instance as described, inter alia, in the aforementioned documents EP-A 816 807, US-A 2011/0178738 or US-A 2012/0123705, to detect, as early as possible, any damage to the at least one vibration element, which can cause an undesired reduction in the measurement accuracy and/or operational reliability of the meter in question.

In the case of measuring transducers having two vibration elements each designed as a measurement tube, these are usually integrated into the respective process line via an inlet-side distributor piece extending between the measurement tubes and an inlet-side connecting flange and via an outlet-side distributor piece extending between the measurement tubes and an outlet-side connecting flange. In the case of measuring transducers having a single measurement tube as a vibration element, the latter usually communicates with the process line via a connecting tube that opens on the inlet side and via a connecting tube that opens on the outlet side. Furthermore, measuring transducers having a single measurement tube as a vibration element each comprise at least one further vibration element, which is specifically designed as a counter-oscillator, for example a tubular, box-shaped or planar counter-oscillator, but which is not in contact with the substance to be measured and which is coupled on the inlet side to the measurement tube to form a first coupling zone and which is coupled on the outlet side to the measurement tube to form a second coupling zone and which substantially rests or oscillates counter to the measurement tube during operation. The inner part of the measuring transducer formed by means of the measurement tube and counter-oscillator is usually held in a protective transducer housing solely by means of the two connecting tubes via which the measurement tube communicates with the process line during operation, especially in a manner allowing vibrations of the inner part relative to the transducer housing. In the case of the measuring transducers with a single, substantially straight measurement tube shown, for example, in U.S. Pat. No. 5,291,792, 5,796,010, 5,945,609, 7,077,014, US-A 2007/0119264, WO-A 01/02816 or else WO-A 99/40 394, said measurement tube and the counter-oscillator are aligned substantially coaxial with one another, as is usual in conventional measuring transducers, in that the counter-oscillator is designed as a substantially straight hollow cylinder and is arranged in the measuring transducer in such a way that the measurement tube is at least partially encased by the counter-oscillator. Comparatively cost-effective steel grades, such as construction steel or machining steel, are generally used as materials for such counter-oscillators, especially also when titanium, tantalum or zirconium are used for the measurement tube.

In order to actively excite or maintain vibrations of the at least one vibration element, not least also the aforementioned useful vibrations, vibration-type measuring transducers further have at least one electromechanical, typically also electrodynamic, vibration exciter acting on the at least one vibration element during operation. The vibration exciter, which is electrically connected to the aforementioned transformer circuit by means of a pair of electrical connection lines, for example in the form of connecting wires and/or in the form of printed conductors of a flexible printed circuit board, is used especially, when actuated by an electrical driver signal generated by drive electronics provided in the transformer circuit and correspondingly conditioned, specifically at least adapted to changing vibration properties of the at least one vibration element, to convert an electrical excitation power fed by means of said driver signal into a driving force acting on the at least one vibration element at a point of action formed by the vibration exciter. The drive electronics are especially also configured to adjust the driver signal by means of internal regulation in such a way that it has a signal frequency corresponding to the useful frequency to be excited, occasionally also changing over time, optionally as a vibration amplitude predetermined by an excitation current, specifically an electrical current of the driver signal. The driver signal can also for example be switched off occasionally during operation of the meter, for example for the purpose of enabling the aforementioned free damped vibrations of the at least one vibration element or, for example, as proposed in the aforementioned document WO-A 2017/143579, in order to protect the drive electronics from overloading.

Vibration exciters of commercially available vibration-type measuring transducers are typically constructed in the manner of a vibration coil that operates according to the electrodynamic principle, specifically an air coil-magnet assembly which is formed by means of an air coil, which in the case of measuring transducers having a measurement tube and a counter-oscillator coupled thereto is usually fixed to the latter, specifically a coil that does not enclose a magnetic core but air instead, and a permanent magnet, which interacts with the at least one air coil, acts as an armature and for example is correspondingly fixed to the aforementioned measurement tube, and in which the respective air coil is positioned at least partially in an air gap, carrying a magnetic flux, of the permanent magnet. The permanent magnet and air coil are usually oriented in such a way that they extend substantially coaxially with one another and are also configured to be moved relative to one another or in opposite directions, in such a way that, when the excitation current flows through the air coil, the permanent magnet and the air coil located in its air gap are moved back and forth substantially translationally. In addition, in conventional measuring transducers, the vibration exciter is usually designed and positioned such that it acts substantially centrally on the at least one measurement tube. As an alternative to a vibration exciter acting rather centrally and directly on the at least one vibration element, for example, two vibration exciters fixed on the inlet side or the outlet side of the at least one vibration element rather than in the center of the at least one vibration element can also be used for the active excitation of mechanical vibrations of the at least one vibration element, as in the aforementioned document U.S. Pat. No. 6,092,429, inter alia, or for example also exciter assemblies formed by means of a vibration exciter acting between the at least one vibration element and the transducer housing can be used, as proposed, inter alia, in U.S. Pat. No. 6,223,605 or 5,531,126.

Due to the useful vibrations of the at least one vibration element, not least also in the case in which the useful vibrations of the at least one vibration element are bending vibrations acting transversely to the flow direction on the flowing substance to measured, Coriolis forces dependent on the current mass flow are also known to be induced in the substance to be measured. These can in turn cause Coriolis vibrations of the vibration element that are dependent on the mass flow and superimposed on the useful vibrations, likewise with useful frequency, such that, between inlet-side and outlet-side vibration movements of at least one measurement tube that executes the useful vibrations and through which the medium flows, a propagation time difference or phase difference can be detected, which is also dependent on the mass flow and can therefore also be used as a measure of mass flow measurement. With a measurement tube that is curved at least in some sections as the vibration element, with which a vibration shape in which said measurement tube is allowed to swing in the manner of a cantilever clamped at one end for the useful vibrations, the resulting Coriolis vibrations correspond, for example, to the bending vibration mode, also sometimes referred to as twist mode, in which the measurement tube executes rotary vibrations about an imaginary rotary vibration axis oriented perpendicular to the mentioned imaginary vibration axis, whereas with a straight measurement tube as the vibration element, the useful vibrations of which are designed as bending vibrations in a single imaginary vibration plane, the Coriolis vibrations are, for example, bending vibrations substantially coplanar with the useful vibrations.

In order to detect both inlet-side and outlet-side vibration movements of the at least one vibration element, not least also those corresponding to the useful vibrations, and to generate at least two electrical vibration measurement signals influenced by the mass flow to be measured, measuring transducers of the type in question also have two or more vibration sensors that are spaced apart from one another along the at least one vibration element and for example are each electrically connected by means of a separate pair of electrical connection lines to a in the aforementioned transformer circuit. Each of the vibration sensors is configured to detect the aforementioned vibration movements at a respective measurement point and to convert them in each case into an electrical vibration measurement signal that represents said vibration movements and contains a useful component, specifically a (spectral) signal component or specifically an AC voltage component at a (signal) frequency corresponding to the useful frequency and at a (signal) amplitude that is dependent on the useful frequency and on a magnetic flux established in the respective vibration sensor, and to provide said vibration measurement signal in each case to the transformer circuit, for example specifically to measurement and control electronics, formed by means of at least one microprocessor, of the transformer circuit for further, possibly also digital processing. In addition, the at least two vibration sensors are designed and arranged in such a way that the aforementioned useful component of the vibration measurement signals generated therewith additionally each have a phase angle dependent on the mass flow, such that a propagation time difference or phase difference dependent on the mass flow can be measured between the useful components of both vibration measurement signals. On the basis of said phase difference, the transformer circuit or its measurement and control electronics recurrently determine mass flow measurement values representing the mass flow. In addition to measuring the mass flow, the density and/or the viscosity of the medium can also be measured, for example on the basis of the useful frequency and/or on an electrical excitation power required for the excitation or maintenance of the useful vibrations or damping of the useful vibrations determined on the basis thereof, and output by the transformer circuit together with the measured mass flow in the form of qualified measurement values. Typically, the two vibration sensors are designed as electrodynamic vibration sensors, especially specifically formed in the same manner as the at least one vibration exciter by means of an air coil-magnet assembly, in this case acting as a plunger coil, in which one air coil is likewise respectively positioned ("immersed") at least partially in an air gap, carrying a magnetic flux, of an associated permanent magnet and in which in addition the air coil and the permanent magnet are configured to be moved relative to one another for generating an induction voltage, such that the air coil is moved back and forth substantially translationally in the air gap. The permanent magnet and the air coil are usually aligned in such a way that they extend substantially coaxially with one another.

It is known that, when electrodynamic vibration sensors are used, the aforementioned phase angles of the useful components of each of the vibration measurement signals can change over time despite a constant mass flow or that the phase difference established between the useful components can occasionally have an interference component that is not dependent on the mass flow, such that a significant phase error, specifically an additional change that is no longer negligible in the phase difference, can be observed. Further investigations on conventional Coriolis mass flow meters have shown that such phase errors can occur especially if the Coriolis mass flow meter in question is positioned in the vicinity of one or more electric motors, transformers, magnets, inverters, or other types of plant parts carrying high electric currents, especially also direct currents, and therefore is also exposed to an occasionally very strong external additional magnetic field, specifically caused outside the Coriolis mass flow meter but also propagating within the Coriolis mass flow meter.

As is also discussed, inter alia, in the aforementioned documents WO-A 01/02812 or U.S. Pat. No. 7,665,369, one possibility for reducing the aforementioned phase error attributable to external magnetic fields consists of, for example, designing the transducer housing using materials having a comparatively high relative magnetic conductivity, for example machining steel or construction steel, so that its effective magnetic resistance is significantly reduced. Another possibility for avoiding measurement errors caused by external magnetic fields would also be, as also proposed in U.S. Pat. No. 7,665,369, to provide slots suppressing eddy currents caused by external magnetic fields in the respective magnet cups of the vibration sensors. Tests have shown, however, that although the aforementioned measures weaken the magnetic fields penetrating into the transducer housing and thereby also contribute to reducing the aforementioned interference component, the phase error cannot always be reduced below a still tolerable level with a reasonable technical complexity, even by combining the two measures. As a result, it cannot easily be ruled out in a conventional Coriolis mass flow meter that, due to an unknown external, possibly also only temporarily established and/or fluctuating, magnetic field, the mass flow is measured with significantly increased, undetected measurement errors or corresponding mass flow measurement values with significantly reduced measurement accuracy are output.

SUMMARY

Proceeding from the aforementioned prior art, an object of the invention consists of improving Coriolis mass flow meters in such a way that the presence of an external magnetic field or its influence on the measurement accuracy can also be at least detected therewith, for example also correspondingly reported in a timely manner.

To achieve the object, the invention consists of a Coriolis mass flow meter, for example specifically a Coriolis mass flow/density meter, for measuring a mass flow of a fluid substance to be measured, for example a gas, a liquid or a dispersion, said Coriolis mass flow meter comprising: a measuring transducer that has at least one vibration element, an exciter assembly, and a sensor assembly and which is configured to conduct the substance to be measured, specifically such that the substance to be measured flows through it at least temporarily; and an electronic transformer circuit, which is electrically coupled to the measuring transducer, specifically both to the exciter assembly thereof and to the sensor assembly thereof, and for example is formed by means of at least one microprocessor. The at least one vibration element is configured to be contacted by the flowing substance to be measured and to be vibrated at the same time, and the exciter assembly is configured to convert electric power fed to the exciter assembly into mechanical power that produces forced mechanical vibrations of the vibration element. The transformer circuit is in turn configured to generate an electric driver signal and feed electric power to the exciter assembly using the driver signal such that the vibration element at least proportionally produces useful vibrations, specifically forced mechanical vibrations at at least one useful frequency, specifically a vibration frequency specified by the electric driver signal and for example corresponding to a resonant frequency of the measuring transducer, said vibrations being suitable for producing Coriolis forces based on the mass flow in the flowing substance to be measured. In order to detect mechanical vibrations of the at least one vibration element, for example specifically its useful vibrations, the sensor assembly has an electrodynamic first vibration sensor and at least one electrodynamic second vibration sensor that is for example structurally identical to the first vibration sensor. The first vibration sensor is configured to convert vibration movements of the at least one vibration element at a first measurement point into an electrical first vibration measurement signal of the sensor assembly, such that said first vibration measurement signal has both at least one first useful component, specifically an AC voltage component at a frequency corresponding to the useful frequency and at an amplitude dependent on the useful frequency and a first magnetic flux, specifically a magnetic flux through the first vibration sensor, and at least one first harmonic component, specifically an AC voltage component at a frequency corresponding to a whole-number multiple, for example specifically double, of the useful frequency and at an amplitude dependent on the first magnetic flux. The second vibration sensor is configured to convert vibration movements of the at least one vibration element at a second measurement point remote from the first measurement point into an electrical second vibration measurement signal of the sensor assembly, such that said second vibration measurement signal has both at least one second useful component, specifically an AC voltage component at a frequency corresponding to the useful frequency and at an amplitude dependent on the useful frequency and a second magnetic flux, specifically a magnetic flux through the second vibration sensor, and at least one second harmonic component, specifically an AC voltage component at a frequency corresponding to a whole-number multiple, for example specifically double, of the useful frequency and at an amplitude dependent on the second magnetic flux. Moreover, the transformer circuit is also configured to receive and evaluate the first and second vibration measurement signals, specifically to determine, using the first and second vibration measurement signals, mass flow measurement values, for example digital mass flow measurement values, representing the mass flow and to determine, using at least one of the first and second vibration measurement signals, characteristic number values for at least one sensor characteristic number, specifically a characteristic number characterizing at least one of the first and second harmonic components and/or dependent on the amplitude of at least one of the first and second harmonic components, for example a peak value of the first harmonic component and/or an effective value of the first harmonic component and/or a rectified value of the first harmonic component and/or a peak-to-peak displacement of the first harmonic component and/or a peak value of the second harmonic component and/or an effective value of the second harmonic component and/or a rectified value of the second harmonic component and/or a peak-to-peak displacement of the second harmonic component, for example such that the at least one sensor characteristic number a distortion factor of one of the first and second vibration measurement signals or a distortion factor of a sum of the first and second vibration measurement signals or a crest factor of one of the first and second vibration measurement signals or a crest factor of a sum of the first and second vibration measurement signals or a total harmonic distortion (THD) of one of the first and second vibration measurement signals or a total harmonic distortion (THD) of a sum of the first and second vibration measurement signals.

According to a first embodiment of the invention, the transformer circuit is configured to compare one or more characteristic number values for the sensor characteristic number with in each case one or more reference values determined for the sensor characteristic number, for example by the manufacturer of the Coriolis mass flow meter and/or during the production of the Coriolis mass flow meter, for example one or more reference values representing a reduced functionality of the sensor assembly and/or one or more reference values representing a malfunction of the sensor assembly and/or one or more reference values representing a Coriolis mass flow meter that is no longer intact.

According to a second embodiment of the invention, the transformer circuit is configured to determine whether one or more characteristic number values for the sensor characteristic number is greater than the at least one reference value for the sensor characteristic number, and, for example specifically if one or more characteristic number values for the sensor characteristic number is greater than one or more reference values representing a reduced functionality of the sensor assembly and/or is greater than one or more reference values representing a malfunction of the sensor assembly and/or is greater than one or more reference values representing a Coriolis mass flow meter that is no longer intact, to output a message indicating this.

According to a third embodiment of the invention, the transformer circuit is configured to generate, from the first vibration measurement signal, a first useful component sequence, specifically a sequence of digital amplitude values that quantify the amplitude of the first useful component, and/or the transformer circuit is configured to generate, from the second vibration measurement signal, a second useful component sequence, specifically a sequence of digital amplitude values quantifying the amplitude of the second useful component. In a development of this embodiment of the invention, the transformer circuit is further configured to generate a first harmonic component sequence, specifically a sequence of digital amplitude values that quantify the amplitude of the first harmonic component, and/or the transformer circuit is further configured to generate, from the second vibration measurement signal, a second harmonic component sequence, specifically a sequence of digital amplitude values quantifying the amplitude of the second harmonic component. In a development of this embodiment of the invention, the transformer circuit is further configured to calculate characteristic number values for the sensor characteristic number using both at least one of the first and second useful component sequences and at least one of the first and second harmonic component sequences.

According to a fourth embodiment of the invention, the transformer circuit has a non-volatile electronic data memory that is configured to store digital data, for example even without an applied operating voltage, for example specifically to store one or more previously determined reference values for the sensor characteristic number. In a development of this embodiment of the invention, one or more reference values for the sensor characteristic number, for example which have been determined in advance by the manufacturer of the Coriolis mass flow meter and/or during production of the Coriolis mass flow meter and/or during operation of the Coriolis mass flow meter, for example specifically one or more reference values representing reduced functionality of the sensor assembly and/or specifically one or more reference values representing a malfunction of the sensor assembly, are stored in the electronic data memory, and/or the transformer circuit is configured to compare one or more characteristic number values for the sensor characteristic number in each case with one or more reference values for the sensor characteristic number that are stored in the data memory.

According to a fifth embodiment of the invention, the transformer circuit is configured to receive and evaluate a start command that initiates at least the determination of the characteristic number values for the first sensor characteristic number, specifically to detect an input of the start command and then to initiate a determination of the characteristic number values for the first sensor characteristic number.

According to a sixth embodiment of the invention, the transformer circuit is configured to receive and evaluate a stop command that at least temporarily prevents the determination of the characteristic number values for the first sensor characteristic number, specifically to detect an input of the stop command and then at least temporarily stop a determination of the characteristic number values for the first sensor characteristic number.

According to a seventh embodiment of the invention, the measurement and control electronics have a first analog to digital converter for the first vibration measurement signal and a second analog to digital converter for the second vibration measurement signal.

According to an eighth embodiment of the invention, the transformer circuit is configured to determine the mass flow measurement values at an update rate that is not lower than, for example is specifically higher than, an update rate at which the transformer circuit determines the characteristic number values for the sensor characteristic number.

According to a ninth embodiment of the invention, each of the first and second useful components has a phase angle dependent on the mass flow. In a development of this embodiment of the invention, the transformer circuit is further configured to calculate the mass flow measurement values on the basis of a phase difference between the first and second useful components, specifically a difference between the phase angle of the first useful component and the phase angle of the second useful component.

According to a tenth embodiment of the invention, the first vibration sensor is formed by means of a first plunger coil and the second vibration sensor is formed by means of a second plunger coil.

According to an eleventh embodiment of the invention, the first vibration sensor has a first permanent magnet, for example mechanically connected to the at least one vibration element to form the first measurement point, and a first air coil, and the second vibration sensor has a second permanent magnet, for example mechanically connected to the at least one vibration element to form the second measurement point, and a second air coil, such that the first permanent magnet forms a first air gap carrying the first magnetic flux, and the first air gap is positioned at least partially inside said first air gap, and the first permanent magnet and the first air coil are designed to be moved relative to one another by vibration movements of the at least one vibration element and to generate a first induction voltage used as a first vibration measurement signal, and such that the second permanent magnet forms a second air gap carrying the second magnetic flux, and the second air coil is at least partially positioned within said second air gap, and the second permanent magnet and the second air coil are designed to be moved relative to one another by vibration movements of the at least one vibration element and to generate a second induction voltage used as a second vibration measurement signal.

According to a twelfth embodiment of the invention, the exciter assembly has a vibration exciter, for example an electrodynamic and/or single vibration exciter, to excite vibrations of the at least one measurement tube.

According to a thirteenth embodiment of the invention, the at least one vibration element is formed by means of at least one tube, which is for example straight at least in some sections and/or arcuate at least in some sections, with one of a tube wall, for example a metallic tube wall, and a lumen surrounded by said tube wall and is designed such that the substance to be measured flows through it while it is vibrated.

A basic concept of the invention is to detect the occasionally occurring influence of external magnetic fields on the sensor assembly of Coriolis mass flow meters on the basis of associated changes in the amplitudes of at least one harmonic component of the vibration measurement signals provided by the sensor assembly. The invention is also based, inter alia, on the surprising finding that an external magnetic field, specifically caused outside the Coriolis mass flow meter, typically not only distorts the useful components of the vibration measurement signals which are required for measuring the mass flow, but especially can also have an influence on the harmonic components which are generally likewise present in the vibration measurement signals at a frequency in each case corresponding to a whole-number multiple of the useful frequency but not to another, possibly likewise excited, resonant frequency of the measuring transducer, in such a manner that the amplitude of at least one of the aforementioned harmonic components deviates significantly from a reference value predefinable therefor, and that such a deviation of the amplitude of at least one of the harmonic components during operation of the Coriolis mass flow meter in question can be used as an indicator of a reduced measurement accuracy owing to interference from an external magnetic field.

An advantage of the invention consists, inter alia, in that a detection of external magnetic fields impairing the measurement accuracy of Coriolis mass flow meters can also already be carried out on the basis of the vibration measurement signals generated anyway during operation of Coriolis mass flow meters. Accordingly, the invention can advantageously be retrofitted in an advantageous manner solely by a corresponding modification of the typically re-programmable transformer circuits even in the case of already installed conventional Coriolis mass flow meters.

BRIEF DESCRIPTION OF THE DRAWINGS

The invention as well as advantageous embodiments thereof are explained in more detail below based on exemplary embodiments shown in the figures of the drawings. Identical or identically acting or identically functioning parts are provided with the same reference signs in all figures; for reasons of clarity or if it appears sensible for other reasons, reference signs mentioned before are dispensed with in subsequent figures. Further advantageous embodiments or developments, in particular combinations of partial aspects of the invention that were initially explained only separately, furthermore result from the figures of the drawing and from the claims themselves.

The figures show in detail:

FIGS. 5a and 5b schematically show a further embodiment of a vibration sensor in cross-sectional side views with field lines of a magnetic field penetrating the vibration sensor;

FIG. 6a shows, by way of example, an amplitude spectrum for a vibration measurement signal generated by the vibration sensor according to FIG. 4a or 5a.

DETAILED DESCRIPTION

Figure 1:
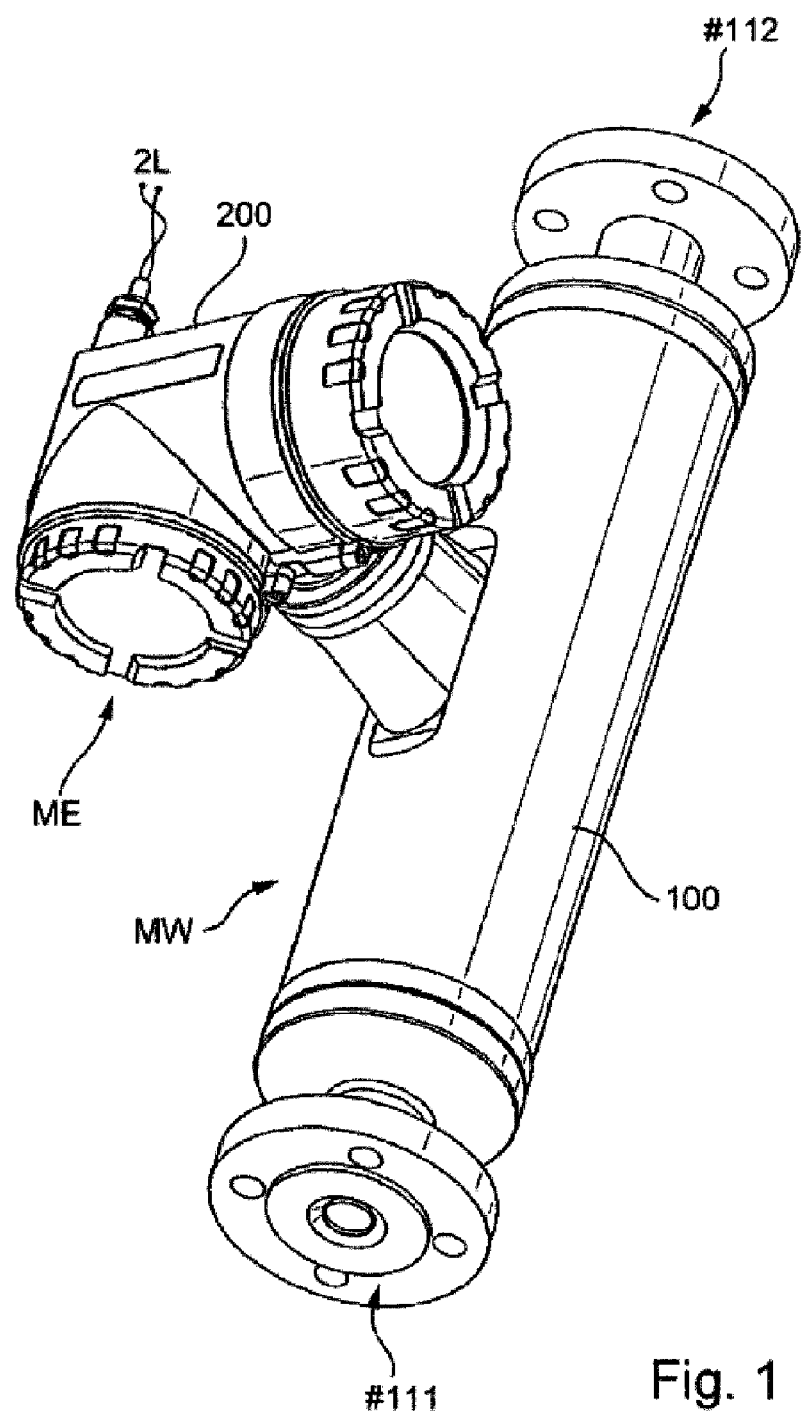
FIG. 1 shows a Coriolis mass flow meter designed here as a compact meter.
Figure 2:
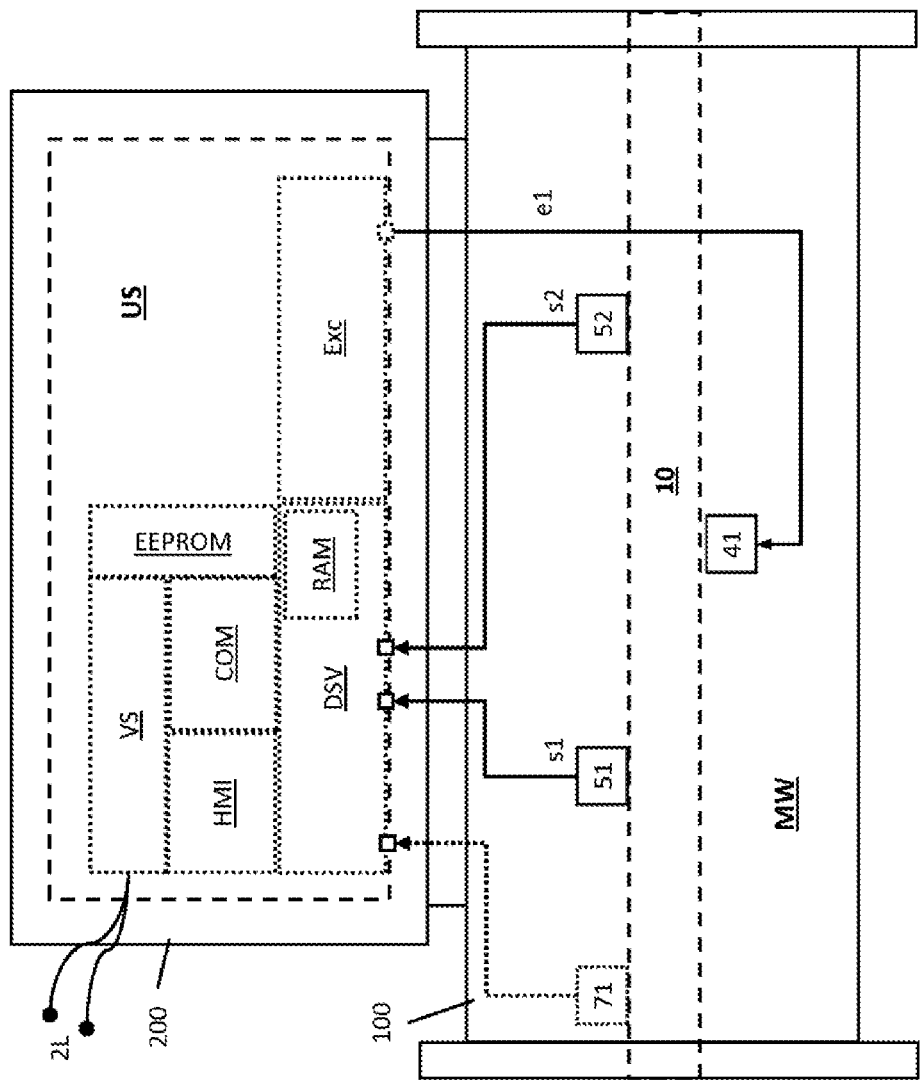
FIG. 2 schematically shows, in the manner of a block diagram, a transformer circuit for the Coriolis mass flow meter according to FIG. 1, with a vibration-type measuring transducer connected thereto and the Coriolis mass flow meter.

FIGS. 1 and 2 show a Coriolis mass flow meter that can be inserted into a process line (not shown here), for example a pipe of an industrial plant, for example a filling plant or refueling device, for flowable media, especially fluid or pourable media, for example specifically also an at least temporarily 2- or multi-phase or inhomogeneous substance to be measured. The Coriolis mass flow meter is used especially for measuring and/or monitoring a mass flow m and for ascertaining mass flow measurement values representing the mass flow of a fluid substance to be measured conducted in the aforementioned process line or at least temporarily allowed to flow therein, for example a gas, a liquid or a dispersion, especially specifically to output the mass flow measurement values. Furthermore, the Coriolis mass flow meter can also be used to measure a density p and/or a viscosity q of the substance to be measured, for example specifically to determine and output the density measurement values representing the density and/or the viscosity measurement values representing the viscosity. According to one embodiment of the invention, it is provided to use the Coriolis mass flow meter for determining mass flow measurement values of a substance to be measured that is to be transferred, for example specifically to be delivered in a predefined or predefinable amount from a supplier to a customer, for example a liquefied gas, such as a liquid gas containing methane and/or ethane and/or propane and/or butane or a liquefied natural gas (LNG), or else a mixture of substances formed by means of liquid hydrocarbons, for example a petroleum or a liquid fuel. The Coriolis mass flow meter can accordingly also be designed, for example, as a component of a transfer point for freight traffic subject to gaging obligations, such as a refueling installation, and/or as a component of a transfer point for example in the manner of the transfer points disclosed in the mentioned documents WO-A 02/060805, WO-A 2008/013545, WO-A 2010/099276, WO-A 2014/151829, WO-A 2016/058745.

The Coriolis mass flow meter, which is also implemented, for example, as a Coriolis mass flow/density meter additionally measuring the density and/or as a Coriolis mass flow/viscosity meter additionally measuring the viscosity, comprises a physical-electrical measuring transducer MW, which is connected to the process line via an inlet end #111 and an outlet end #112 and is configured such that the substance to be measured flows through it during operation, and an electronic transformer circuit US, which is coupled to said measuring transducer and is especially formed by means of at least one microprocessor and/or is supplied with electrical energy during operation by means of internal stored energy sources and/or externally via connection cables. The electric coupling or connection of the measuring transducer MW to the transformer circuit US can be effected by means of corresponding electrical connecting lines and corresponding cable feedthroughs. In this case, the connecting lines can be formed at least partially as electrical conductor wires sheathed at least in sections by electrical insulation, for example in the form of "twisted pair" lines, ribbon cables and/or coaxial cables. As an alternative or in addition thereto, the connecting lines can also be formed at least in sections by means of printed conductors of a printed circuit board, especially a flexible, optionally varnished printed circuit board.

Advantageously, the transformer circuit US, for example also programmable and/or able to be remotely parametrized, can furthermore be designed such that it can exchange measurement data and/or other operating data, for example also status messages, such as current measurement values or setting values and/or diagnostic values used to control the measurement system, with a higher-level electronic data processing system (not shown here), e.g. a programmable logic controller (PLC), a personal computer and/or a workstation, via a data transmission system, e.g. a field bus system and/or a wireless radio connection, during the operation of the Coriolis mass flow meter. Accordingly, the transformer circuit US can have, for example, such transmitting and receiving electronics COM, which is fed during operation by a (central) evaluation and supply unit provided in the aforementioned data processing system and remote from the measurement system. For example, the transformer circuit US (or its aforementioned transmitting and receiving electronics COM) can be designed such that it can be connected electrically to the aforementioned external electronic data processing system via a two-conductor connection 2L, optionally also configured as a 4-20 mA current loop, and, via said connection, can both obtain the electrical power required for operating the Coriolis mass flow meter from the aforementioned evaluation and supply unit of the data processing system and transmit measurement values to the data processing system, for example by (load) modulating a direct supply current fed by the evaluation and supply unit. In addition, the transformer circuit US can also be designed such that it can be operated nominally at a maximum power of 1 W or less and/or is intrinsically safe. The transformer circuit US of the Coriolis mass flow meter according to the invention can also be of modular construction, for example, such that various electronic components of the transformer circuit US, such as drive electronics Exc for actuating the measuring transducer, measurement and control electronics DSV for processing measurement signals provided by the measuring transducer and for determining measurement values on the basis of measurement signals from the measuring transducer, an internal power supply circuit VS for providing one or more internal operating voltages, and/or the aforementioned transmitting and receiving electronics COM used for communication with a higher-level measurement data processing system or an external field bus, respectively arranged on a separate printed circuit board and/or respectively formed by means of a dedicated microprocessor. To visualize measurement values generated inside the meter and/or system status messages generated inside the meter such as an error message or an alarm, on site, the Coriolis mass flow meter can furthermore have a display and operating element HMI, which communicates at least intermittently with the transformer circuit US, for example specifically with the aforementioned measurement and control electronics DSV thereof, such as an LCD, OLED or TFT display positioned in the aforementioned electronic housing 200, behind a window provided correspondingly therein and a corresponding input keypad and/or a touchscreen. Furthermore, as is also readily apparent by viewing FIGS. 1 and 2 together, the transformer circuit US can also be accommodated, for example, in a corresponding separate, especially impact-resistant and/or also explosion-proof and/or hermetically sealed, electronics housing 200.

The measuring transducer MW is a vibration-type measuring transducer, specifically a measuring transducer with at least one vibration element 10, with an exciter assembly 41 and with a sensor assembly 51, 52, wherein both the exciter assembly 41 and the sensor assembly are electrically coupled to the transformer circuit US, and the at least one vibration element 10 is configured to come into contact with the flowing substance to be measured, for example such that the substance to be measured flows through and/or around it, and to be vibrated at the same time, for example specifically at at least one resonant frequency inherent to the vibration element or the measuring transducer formed therewith. The exciter assembly 41 of the measuring transducer MW, in turn, is configured to convert electrical power fed thereto into mechanical power causing forced mechanical vibrations of the at least one vibration element 10. The measuring transducer can accordingly be, for example a conventional vibration-type measuring transducer, for example specifically also a measuring transducer known from the aforementioned documents EP-A 816 807, US-A 2002/0033043, US-A 2006/0096390, US-A 2007/0062309, US-A 2007/0119264, US-A 2008/0011101, US-A 2008/0047362, US-A 2008/0190195, US-A 2008/0250871, US-A 2010/0005887, US-A 2010/0011882, US-A 2010/0257943, US-A 2011/0161017, US-A 2011/0178738, US-A 2011/0219872, US-A 2011/0265580, US-A 2011/0271756, US-A 2012/0123705, US-A 2013/0042700, US-A 2016/0313162, US-A 2017/0261474, U.S. Pat. Nos. 4,491,009, 4,756,198, 4,777,833, 4,801,897, 4,876,898, 4,996,871, 5,009,109, 5,287,754, 5,291,792, 5,349,872, 5,705,754, 5,796,010, 5,796,011, 5,804,742, 5,831,178, 5,945,609, 5,965,824, 6,006,609, 6,092,429, 6,223,605, 6,311,136, 6,477,901, 6,505,518, 6,513,393, 6,651,513, 6,666,098, 6,711,958, 6,840,109, 6,920,798, 7,017,424, 7,040,181, 7,077,014, 7,200,503, 7,216,549, 7,296,484, 7,325,462, 7,360,451, 7,792,646, 7,954,388, 8,333,120, 8,695,436, WO-A 00/19175, WO-A 00/34748, WO-A 01/02816, WO-A 01/71291, WO-A 02/060805, WO-A 2005/093381, WO-A 2007/043996, WO-A 2008/013545, WO-A 2008/059262, WO-A 2010/099276, WO-A 2013/092104, WO-A 2014/151829, WO-A 2016/058745, WO-A 2017/069749, WO-A 2017/123214, WO-A 2017/143579, WO-A 85/05677, WO-A 88/02853, WO-A 89/00679, WO-A 94/21999, WO-A 95/03528, WO-A 95/16897, WO-A 95/29385, WO-A 98/02725, WO-A 99/40 394 or PCT/EP2017/067826. As is customary in the case of measuring transducers of the type in question and Coriolis mass flow meters formed therewith, the vibration element 10 can be formed, for example, by means of one or more tubes, especially tubes that are straight at least in some sections and/or arcuate at least in some sections, with one of a tube wall, especially a metallic tube wall, and a lumen surrounded by said tube wall, wherein the tube or each of the tubes is configured to conduct the at least temporarily flowing fluid substance to be measured (and such that said substance to be measured flows through it) and to be vibrated at the same time. However, the vibration element can also be formed, for example, by means of one or more displacement elements positioned inside a lumen of a tube of a tube of the measuring transducer through which the substance to be measured flows, the displacement element or each of the displacement elements each being configured such that the substance to be measured flows around them while they are vibrated. As is also indicated in FIG. 2 or can easily be seen by viewing FIGS. 1 and 2 together, the at least one vibration element 10 can also be accommodated within a transducer housing 100, together with the exciter assembly 41 and the sensor assembly and any other components of the measuring transducer. In addition, for example, the aforementioned electronics housing 200 can be mounted on said transducer housing 100 to form a Coriolis mass flow meter of compact design, as also illustrated in FIGS. 1 and 2.

According to a further embodiment of the invention, the exciter assembly is formed, as is quite usual in the case of vibration-type measuring transducers, by means of at least one electromechanical vibration exciter 41, for example specifically an electrodynamic, electromagnetic or piezoelectric vibration exciter, which can be positioned, as also shown in FIG. 2, such that a force generated therewith acts on the vibration element in the direction of an imaginary force action line running through a center of mass of the at least one vibration element, and/or which can also be, for example, the vibration exciter, effecting the only vibrations of the vibration element 10, of the exciter assembly or of the measuring transducer formed therewith, as also shown in FIG. 2.

The transformer circuit US of the Coriolis mass flow meter according to the invention is also, inter alia, provided and correspondingly configured to generate an electrical driver signal e1, for example a bipolar and/or at least intermittently periodic, possibly also harmonic electrical driver signal, and thus to feed electrical power into the exciter assembly of the measuring transducer MW, such that the at least one vibration element 10 executes at least proportionally produces useful vibrations, specifically forced mechanical vibrations at a useful frequency $f_N$, which are suitable for producing Coriolis forces, which are dependent on the mass flow and act on the vibration element 10, in the flowing substance to be measured such that Coriolis vibrations, specifically mechanical vibrations additionally forced by the Coriolis forces and dependent on the mass flow m of the substance to be measured, are superimposed on the aforementioned useful vibrations at the useful frequency $f_N$. The useful frequency $f_N$ is a vibration frequency of the forced mechanical vibrations of the vibration element that is predetermined by the electrical driver signal e1 and for example corresponds to the aforementioned resonant frequency $f_R$ of the measuring transducer ($f_N = f_R$). The driver signal e1 can accordingly be, for example, a harmonic electrical signal that forms the aforementioned signal component $e1_N$ determining the useful frequency $f_N$ or, for example, also a multi-frequency electrical signal that is composed of multiple (spectral) signal components and contains a spectral useful component $e1_N$ determining the useful frequency $f_N$. As is usual in Coriolis mass flow meters, the useful vibrations excited by means of the exciter assembly 41 and the transformer circuit US connected thereto can also be, for example, bending vibrations of the at least one vibration element 10 about an associated rest position, and, for example a current resonant frequency, also dependent on the density and/or viscosity of the substance to be measured conducted in the measuring transducer and in contact with the vibration element 10 thereof, of a bending vibration mode, having only one vibration loop, of the at least one vibration element 10 and/or a lowest current resonant frequency of the at least one vibration element 10 can be selected, specifically set by means of the driver signal e1, as the useful frequency $f_N$. As is usual in Coriolis mass flow meters, to generate the driver signal e1 and to set the useful frequency $f_N$, the transformer circuit US can have, for example, corresponding drive electronics Exc, especially formed by means of one or more phase locked loops (PLL) used to determine and set the useful frequency $f_N$. According to a further embodiment of the invention, the drive electronics Exc have a digital frequency output. In addition, the drive electronics Exc are also configured to output at said frequency output a frequency sequence, specifically a sequence of digital frequency values that quantify the signal frequency set for the driver signal e1, for example specifically the currently set useful frequency (or the signal frequency of its signal component $e_{N1}$).

Figure 3:
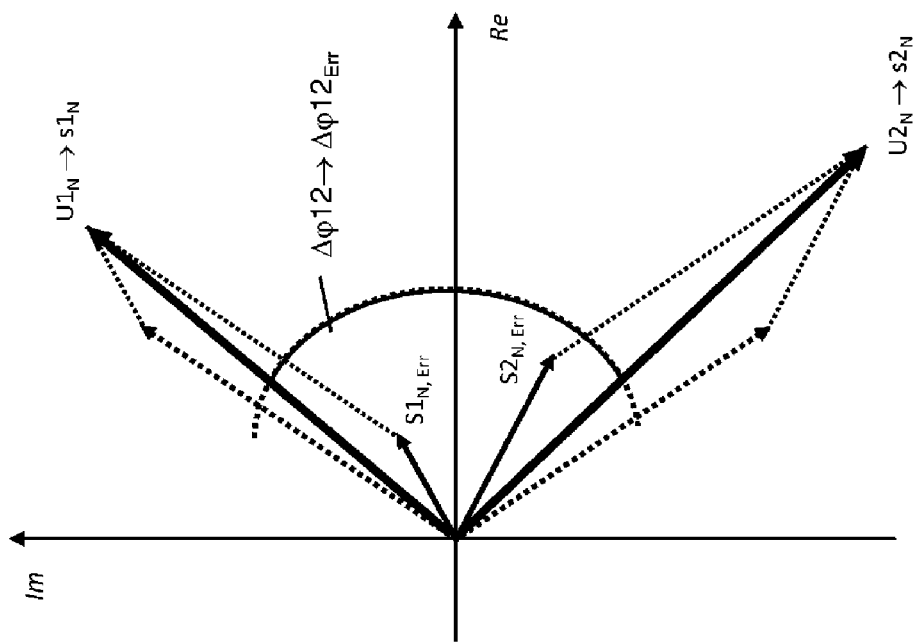
FIG. 3 shows a phasor diagram (i.e., a vector diagram with static vectors) for signal components of vibration measurement signals generated by the Coriolis mass flow meter according to FIG. 1 or by the transformer circuit according to FIG. 2 connected to a vibration-type measuring transducer.
Figure 6A:
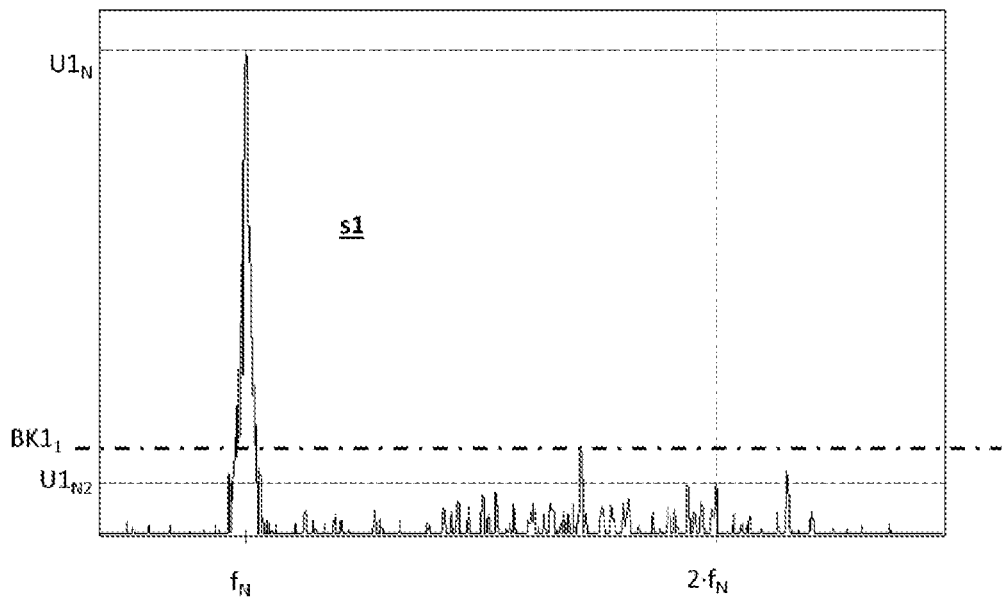
Figure 6B:
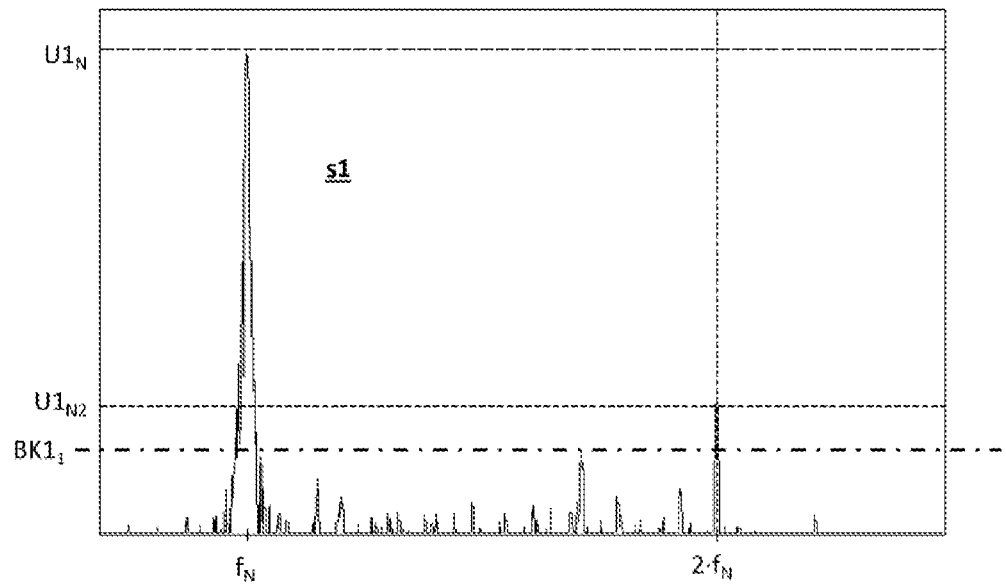
FIG. 6b shows, by way of example, an amplitude spectrum for a vibration measurement signal generated by the vibration sensor according to FIG. 4b or 5b.

The sensor assembly of the measuring transducer is in turn configured to detect mechanical vibrations of the at least one vibration element 10, not least also forced mechanical vibrations of the at least one vibration element 10, and to provide vibration measurement signals (s1, s2) representing at least proportionally vibration movements of the at least one vibration element 10. To detect mechanical vibrations of the at least one vibration element, the sensor assembly of the Coriolis mass flow meter according to the invention has an electrodynamic first vibration sensor 51, for example formed by means of a first plunger coil, and at least one electrodynamic second vibration sensor 52, for example formed by means of a second plunger coil and/or structurally identical to the first vibration sensor 51. In particular, the vibration sensor 51 is configured to convert vibration movements of the at least one vibration element 10 at a first measurement point into an electrical first vibration measurement signal s1 of the sensor assembly, such that, as shown in FIG. 3 using a phasor diagram and in FIG. 6a or 6b in each case using an amplitude spectrum, said vibration measurement signal s1 has at least one first useful component $s1_N$ (dependent on the time t), specifically an AC voltage component at a frequency corresponding to the useful frequency $f_N$, and the vibration sensor 52 is configured to convert vibration movements of the at least one vibration element at a second measurement point, remote from the first measurement point, into an electrical second vibration measurement signal s2 of the sensor assembly, such that, as also indicated in FIG. 3, said vibration measurement signal s2 has at least one second useful component $s2_N$ (dependent on the time t), specifically an AC voltage component at a frequency corresponding to the useful frequency $f_N$. Given that each of the two vibration sensors 51 52 is an electrodynamic vibration sensor, the useful component $s1_N$ accordingly has an amplitude $U1_{N1}$ (or voltage level) depending on the useful frequency $f_N$ and on a first magnetic flux $\Phi 1$, shown schematically in FIGS. 4a and 4b, specifically a magnetic flux through the vibration sensor 51, and the useful component $s2_N$ accordingly has an amplitude $U2_{N1}$ (or voltage level) depending on the useful frequency $f_N$ and on a second magnetic flux $\Phi 2$, shown schematically in FIGS. 5a and 5b, specifically a magnetic flux through the vibration sensor 52. Given that an inner magnetic field H0, specifically established inside the respective vibration sensor and the measuring transducer formed therewith during the calibration thereof or during the calibration of the Coriolis mass flow meter formed therewith, and corresponding to the aforementioned magnetic fluxes $\Phi 1$ and $\Phi 2$, naturally differs from an ideal homogeneous distribution and therefore often does not have a space-invariant or constant magnetic flux density (B1, B2), the vibration signals s1, s2 contain, in addition to the respective useful component, corresponding harmonic components, specifically one or more different AC voltage components, each at a frequency corresponding to a whole-number multiple of the useful frequency but not to another, possibly excited, resonant frequency of the measuring transducer, the respective amplitude of which is likewise dependent on the respective magnetic flux ($\Phi 1$, $\Phi 2$). Accordingly, the vibration measurement signal s1 additionally has at least one first harmonic component $s1_{N2}$, specifically an AC voltage component at a frequency corresponding to a whole-number multiple, for example specifically double, of the useful frequency, and, as also indicated in each case in FIG. 6a or 6b and can easily be seen by viewing the two figures together, at an amplitude $U1_{N2}$ dependent on the magnetic flux $\Phi 1$, and the vibration measurement signal s2 also has at least one second harmonic component $s2_{N2}$, specifically an AC voltage component at a frequency corresponding to a whole-number multiple, for example specifically double, the useful frequency and at an amplitude $U2_{N2}$ dependent on the magnetic flux $\Phi 2$, although the vibration element 10 does not execute any mechanical vibrations at a frequency and amplitude corresponding thereto.

Each of the two vibration sensors can, as also indicated in each case in FIGS. 4a and 4b or 5a and 5b and as is entirely customary in measuring transducers of the type in question, be formed for example by means of a plunger coil. Accordingly, according to a further embodiment of the invention, the vibration sensor 51 has a first permanent magnet 51A, for example specifically mechanically connected to the at least one vibration element to form the first measurement point, and a first air coil 51B, for example mechanically connected to the at least one vibration element 10 and/or to the aforementioned transducer housing, and that the vibration sensor 52 has a second permanent magnet 52A, for example specifically mechanically connected to the at least one vibration element to form the second measurement point, and a second air coil 52B, for example mechanically connected to the at least one vibration element and/or to the aforementioned transducer housing. The first permanent magnet 51A forms a first air gap 51C carrying the magnetic flux $\Phi 1$, within which air gap the first air coil 51B is at least partially positioned, and the second permanent magnet 52A forms a second air gap 52C carrying the magnetic flux $\Phi 2$, within which air gap the second air coil 52B is at least partially positioned. Furthermore, the first permanent magnet and the first air coil are configured to be moved relative to one another by vibration movements of the useful vibrations of the at least one vibration element and to generate a first induction voltage $u_{i1}$ ($u_{i1} \rightarrow s1$) corresponding to the useful vibrations and therefore forming at least a partial voltage of the vibration measurement signal s1, and the second permanent magnet and the second air coil are configured to be moved relative to one another by vibration movements of the at least one vibration element and to generate a second induction voltage $u_{i2}$ ($u_{i1} \rightarrow s2$) corresponding the useful vibrations and therefore forming at least a partial voltage of the vibration measurement signal s2, wherein, according to the law of induction (for motion induction), the aforementioned first and second induction voltages are each dependent on a respective linkage flux or induction flux ($\Psi 1 = N1 \cdot \Phi 1$ and $\Psi 2 = N2 \cdot \Phi 2$), specifically a total magnetic flux within the respective first or second air coil, and therefore on the respective magnetic flux $\Phi 1$ and $\Phi 2$ and an associated winding number (N1 and N2), and also each contain the aforementioned harmonic components (j>1), especially one of the conditions:

$$u_{i1} = \sum_{j=1}^{M} U1_{Nj} = \quad (1)$$

$$\frac{d\Psi 1}{dt} = N1 \cdot \frac{d\Phi 1}{dt} \sim \sum_{j=1}^{M} N1 \cdot \Phi 1 \cdot 2\pi \cdot j \cdot f_N \cdot \cos(2\pi \cdot j \cdot f_N \cdot t) \to s1$$

or $$u_{i2} = \sum_{j=1}^{M} U2_{Nj} = \quad (2)$$

$$\frac{d\Psi 2}{dt} = N2 \cdot \frac{d\Phi 2}{dt} \sim \sum_{j=1}^{M} N2 \cdot \Phi 2 \cdot 2\pi \cdot j \cdot f_N \cdot \cos(2\pi \cdot j \cdot f_N \cdot t) \to s2.$$

The vibration measurement signals s1, s2 generated by the measuring transducer MW are then supplied to the transformer circuit US, for example via electrical connection lines, in order to be correspondingly processed there, for example by means of digital signal processing (DSP), specifically preamplified, filtered and digitized and then evaluated accordingly. According to a further embodiment of the invention, the vibration sensors s1, s2 are arranged such that, in the event of an excitation of the aforementioned Coriolis vibrations of the at least one vibration element 10, each of the useful components $s1_N$, $s2_N$ of the vibration measurement signals s1 and s2 also has a phase angle that is dependent on the mass flow m of the substance to be measured flowing through the measuring transducer MW and can for example be measured relative to the driver signal e1 or the useful component $e1_N$ thereof; this is done especially in such a manner that, as also indicated in FIG. 3, a phase difference $\Delta\varphi 12$ ($\Delta\varphi f(m)$), which is dependent on said mass flow m, exists between the useful component $s1_N$ of the vibration signal s1 and the useful component $s2_N$ of the vibration signal s2, specifically a difference between the phase angle of the first useful component $s1_N$ and the phase angle of the second useful component $s2_N$ or that the vibration measurement signals s1, s2 follow a change in the mass flow of the substance to be measured conducted in the measuring transducer with a change in said phase difference $\Delta\varphi 12$ ($\Delta\varphi 12^*$). As is usual in such measuring transducers and is also indicated in FIG. 2, the vibration sensors s1, s2 can accordingly be positioned, for example, at the same distance from a center of mass of the at least one vibration element 10, for example therefore from the center of mass of the at least one tube or from the center of mass of the at least one displacement element, such that, as viewed in the flow direction, the vibration sensor 51 is arranged on the inlet side of the at least one vibration element 10 or in the vicinity thereof, and the vibration sensor 52 is arranged on the outlet side of the at least one vibration element 10 or in the vicinity thereof. In addition, the two vibration sensors s1, s2 can also be the only vibration sensors that are used to detect vibrations of the at least one vibration element 10, such that the sensor assembly does not have any other vibration sensors apart from said vibration sensors s1, s2. According to a further embodiment of the invention, the sensor assembly has at least one temperature sensor 61 for detecting a temperature of the measuring transducer at a temperature measurement point, said temperature sensor being configured to provide a temperature measurement signal, specifically a measurement signal representing the temperature at the temperature measurement point, especially with an electrical voltage dependent on the temperature and/or an electrical current dependent on the temperature. Alternatively or in addition, the sensor assembly can also have, for example, at least one strain sensor that is used to detect mechanical stresses within the measuring transducer.

As already mentioned, the transformer circuit US is also provided and configured, in addition to generating the driver signal e1, for receiving and evaluating the vibration measurement signals s1, s2, specifically to determine, on the basis of the vibration measurement signals s1, s2, for example specifically on the basis of the aforementioned phase difference $\Delta\varphi 12$ between the first and second useful components, mass flow measurement values representing the mass flow, for example at a measurement value update rate of no less than 1 s$^{-1}$ (=1 measurement value per second), and to output said values for example specifically in the form of analog values and/or in the form of digital values. According to a further embodiment of the invention, the transformer circuit US is accordingly also configured to first determine the phase difference $\Delta\varphi 12$ on the basis of the vibration measurement signals s1, s2. In addition, the transformer circuit US can also be configured to determine, from at least one of the vibration measurement signals s1, s2 present, the respective aforementioned phase angle of its respective useful component $s1_N$, $s2_N$, for example relative to the driver signal e1 or the aforementioned useful component $e1_N$ thereof, for example to generate, during operation, at least one phase sequence, specifically a sequence of digital phase values quantifying the phase angle of one of the first and second useful components, and/or a frequency sequence, specifically a sequence of digital frequency values quantifying the useful frequency $f_N$, such that the phase sequence corresponds to a curve over time of the phase angle of the corresponding useful component, and the frequency sequence corresponds to a curve over time of the useful frequency. The determination of the phase angles or the generation of the aforementioned phase sequence can be realized, for example, as is usual in Coriolis mass flow meters, by means of a quadrature demodulation (Q/I demodulation) of the respective vibration measurement signal carried out in the transformer circuit US using a first harmonic reference signal (Q) having the useful frequency and a second harmonic reference signal (I) phase-shifted 90° thereto. Not least for the mentioned case in which the useful vibrations caused by the driver signal e1 are resonant vibrations of the at least one vibration element 10, the useful frequency $f_N$ of the vibration measurement signals s1, s2 can be used as a measure of the density and/or the viscosity of the substance to be measured, and accordingly the density and/or the viscosity can be determined by means of the transformer circuit US on the basis of the aforementioned frequency sequence. Not least for the aforementioned case in which the sensor assembly has a temperature sensor 61 and/or a strain sensor, according to a further embodiment of the invention the transformer circuit US is also configured to receive and process, especially to digitize and evaluate, the temperature measurement signal generated by the temperature sensor and/or the strain measurement signal generated by the strain sensor; this is done, for example, in such a way that the transformer circuit US determines a temperature of the displacement element and/or a temperature of the substance to be measured on the basis of the at least one temperature measurement signal.

According to a further embodiment of the invention, the transformer circuit US is further configured to generate, on the basis of the vibration measurement signal s1, a first useful component sequence, specifically a sequence of digital amplitude values $U1_{N1}[m]$ ($m \in \mathbb{N}$—natural numbers)

quantifying the amplitude $U1_{N1}$ of the first useful component $s1_N$, and the transformer circuit is also configured to generate, on the basis of the vibration measurement signal s2, a second useful component sequence, specifically a sequence of digital amplitude values $U2_{N1}[n]$ ($n \in N$) quantifying the amplitude $U2_N$ of the second useful component $s2_N$, specifically such that the amplitude values $U1_{N1}[m]$ are determined at equidistantly successive time points $t_m = m \cdot T_{s1}$, and therefore at an update rate $f_{s1} = 1/(t_{m+1} - t_m) = 1/T_{s1}$ and the amplitude values $U2_N[n]$ are determined at equidistantly successive time points $t_n = n \cdot T_{s2}$, and therefore at an update rate $f_{s2} = 1/(t_{n+1} - t_n) = 1/T_{s2}$, such that the first useful component sequence at least approximately corresponds to a curve over time of the amplitude $U1_N$ of the first useful component $s1_N$ and the second useful component sequence at least approximately corresponds to a curve over time of the amplitude $U2_{N1}$ of the second useful component $s2_N$. The aforementioned update rates $f_{s1}$, $f_{s2}$ can be selected, for example, such that they are the same ($f_{s1} = f_{s2}$) and/or that an amplitude value $U1_{N1}[m]$ is in each case determined substantially chronologically to a corresponding amplitude $U2_{N1}[n]$ ($t_m = t_n$). Furthermore, the transformer circuit US can further be configured to generate, on the basis of the vibration measurement signal s1, a first harmonic component sequence, specifically a sequence of digital amplitude values $U1_{N2}[k]$ ($k \in N$, $k > 1$) quantifying the amplitude $U1_{N2}$ of the first harmonic component $s1_{N2}$, and the transformer circuit is also configured to generate, on the basis of the vibration measurement signal s2, a second harmonic component sequence, specifically a sequence of digital amplitude values $U2_{N2}[l]$ ($l \in N$, $l > 1$) quantifying the amplitude $U2_{N2}$ of the second harmonic component $s2_{N2}$, for example specifically such that the amplitude values $U1_{N2}[k]$ are determined at equidistantly successive time points $t_k = k \cdot T_{s3}$, and therefore at an update rate $f_{s3} = 1/(t_{k+1} - t_k) = 1/T_{s3}$, and the amplitude values $U2_{N2}[l]$ are determined at equidistantly successive time points $t_l = l \cdot T_{s4}$, and therefore at an update rate $f_{s4} = 1/(t_{l+1} - t_l) = 1/T_{s4}$, such that the first harmonic component sequence at least approximately corresponds to a curve over time of the amplitude of the first harmonic component $s1_{N2}$ and the second harmonic component sequence at least approximately corresponds to a curve over time of the amplitude of the second harmonic component $s2_{N2}$. The aforementioned update rates $f_{s3}$, $f_{s4}$ can be selected, for example, such that they are the same ($f_{s3} = f_{s4}$) and/or that an amplitude value $U1_{N2}[k]$ is in each case determined substantially chronologically to a corresponding amplitude $U2_{N2}[l]$ ($t_k = t_l$). In addition, update rates $f_{s2}$, $f_{s3}$, $f_{s4}$ can be also be selected, for example, such that they are the same, and therefore $f_{s1} = f_{s2} = f_{s3} = f_{s4}$.

The determination of the harmonic components $s1_N$, $s2_N$ and the generation of the aforementioned first and second harmonic component sequences can also be realized, for example, by quadrature demodulation (Q/I demodulation) of the respective vibration measurement signal s1 and s2, respectively, in this case specifically using a fourth harmonic reference signal (Q2) having the corresponding multiple, for example double, of the useful frequency and a fourth harmonic reference signal (I2) phase-shifted 90° thereto. Alternatively or in addition, the useful and/or harmonic components and their respective amplitudes $U1_{N1}$, $U2_{N1}$, $U1_{N2}$ and $U2_{N2}$ can for example also be determined by means of a Fourier analysis of the vibration measurement signals s1, s2 carried out in the transformer circuit US, for example specifically a discrete Fourier transform (DFT) applied to the vibration measurement signals s1, s2.

For processing the vibration measurement signals s1, s2 supplied by the measuring transducer, possibly also the aforementioned temperature measurement signal and/or strain measurement signal, for example specifically also for determining the mass flow measurement values and possibly also for determining the density measurement values and/or the viscosity measurement values, the transformer circuit US can also have, as indicated above, corresponding measurement and control electronics DSV, which, as shown schematically in FIG. 2, are electrically connected to the measuring transducer MW or the sensor assembly s1, s2 thereof, for example such that a first measurement signal input of the transformer circuit US for the vibration measurement signal s1 and at least one second measurement signal input of the transformer circuit US for the vibration measurement signal s2 are formed by the measurement and control electronics DSV. The measurement and control electronics DSV can advantageously be configured to digitally process the supplied vibration measurement signals s1, s2, and possibly also the temperature measurement signals and/or strain measurement signals, for example specifically by means of at least one microprocessor and/or at least one digital signal processor (DSP) and/or by means of a programmable logic module (FPGA) and/or by means of a custom-programmed logic module (ASIC). The program codes executed in one or more of the aforementioned microprocessors or digital signal processors of the transformer circuit US during operation of the Coriolis mass flow meter can each be stored persistently, for example, in one or more non-volatile data memories (EEPROM) of the transformer circuit US and, when the latter is started up, loaded into a volatile data memory (RAM) provided in the transformer circuit US or in the measurement and control electronics DSV, for example integrated in the microprocessor. For processing in the microprocessor or in the digital signal processor, the vibration measurement signals s1, s2 can of course first be converted into corresponding digital signals by means of corresponding analog to digital converters (A/D), for example specifically by digitizing the respective signal voltage of the vibration measurement signals s1, s2; cf. for example the aforementioned U.S. Pat. No. 6,311,136 or 2011/0271756. Accordingly, according to a further embodiment of the invention, a first analog to digital converter for the vibration measurement signal s1 and/or a second analog to digital converter for the vibration measurement signal s2, for example specifically in the aforementioned measurement and control electronics DSV, and/or at least one non-volatile electronic data memory EEPROM is provided in the transformer circuit US, said memory being configured to store digital data, for example specifically also without an applied operating voltage. The aforementioned phase sequence and/or the aforementioned frequency sequence can also be generated by means of the measurement and control electronics DSV, for example specifically also output at a corresponding digital phase output or at a corresponding digital frequency output and thus provided for further processing in the transformer circuit US. For the case in which the transformer circuit US is formed by means of the aforementioned drive electronics Exc and by means of the aforementioned measurement and control electronics DSV, its phase output can be electrically connected to a phase input of a phase comparator, which is provided in the drive electronics Exc and, for example, also forms a component of the aforementioned phase-locked loop (PLL), and said phase comparator can also be configured to identify a phase difference between the aforementioned signal component $e1_N$ of the driver signal e1 and at least one of the useful components $s1_N$, $s2_N$ and/or to determine the extent of said phase difference. According to a further embodiment of the invention, the measurement and control electronics DSV are also configured to generate the aforementioned first and second useful component sequences and to output at least one of the useful component sequences at a digital amplitude output. The aforementioned amplitude output of the measurement and control electronics DSV can also be electrically connected, for example, to an amplitude input of the drive electronics Exc, which detects an amplitude of the vibrations of the at least one vibration element 10, and the drive electronics Exc can additionally be configured to generate the driver signal e1 on the basis of the amplitude sequence such that the vibrations of the at least one vibration element or its useful vibrations reach or do not permanently exceed or fall below a predetermined vibration amplitude.

Figure 4B:
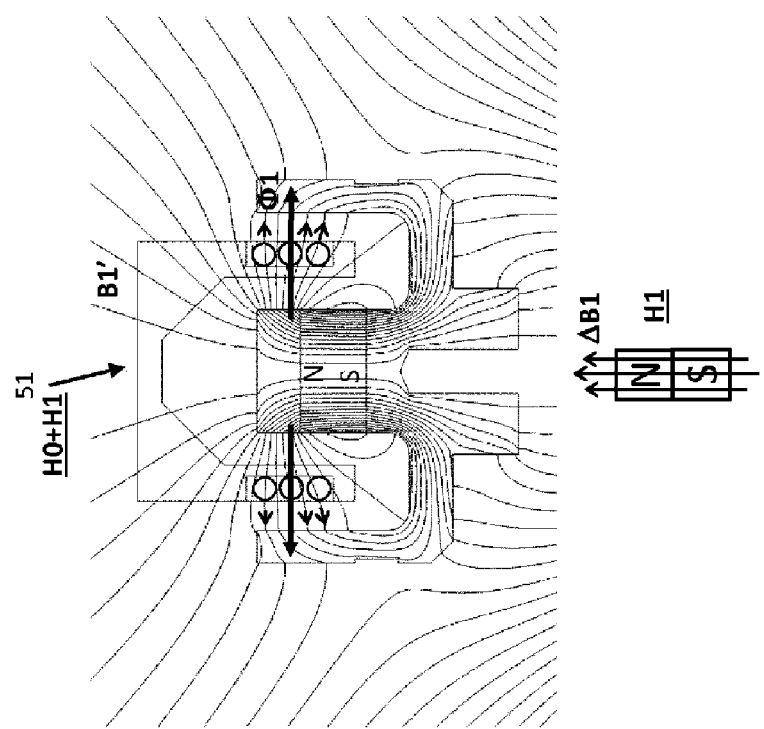
FIGS. 4a and 4b schematically show an embodiment of a vibration sensor in cross-sectional side views with field lines of a magnetic field penetrating the vibration sensor.
Figure 4A:
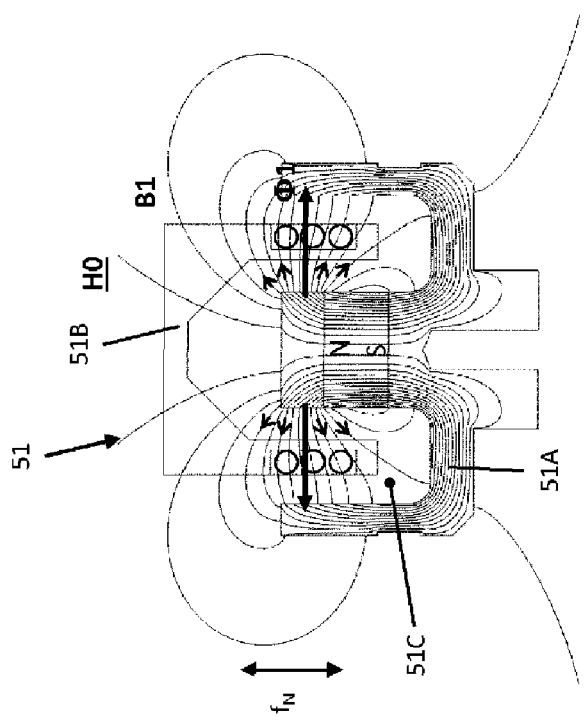

As already mentioned, the useful components of the two vibration measurement signals s1, s2 or their amplitudes, owing to the operating principle of the two electrodynamic vibration sensors, are dependent on the change over time of the magnetic flux within the vibration sensor, in the case of a plunger coil as the vibration sensor specifically the linkage or induction flux within the respective air coil; this is especially done such that an additional influence of the known internal magnetic field H0 caused from outside the Coriolis mass flow meter during the measurement operation thereof and an associated influence of a known change behavior ($\Delta\Phi1/\Delta\Phi2/\Delta t$), specifically determined by the aforementioned calibration, of the magnetic flux within the first and/or second vibration sensor, not least also a change behavior ($\Delta\Phi1$, $\Delta\Phi2$) of the magnetic flux $\Phi1$ and $\Phi2$ per vibration period of the useful vibrations, can, by means of an external magnetic field H1 caused outside the Coriolis mass flow meter but also propagating inside the Coriolis mass flow meter, cause an undesired influence on the first and/or second useful component, which can lead for example specifically to increased errors in the measurement of the mass flow and therefore impairment of the functionality of the sensor assembly. Causes of such an external magnetic field may be, for example, an electric field generated in the vicinity of the Coriolis mass flow meter in question, for example owing to electric motors, transformers, inverters, or plant parts carrying high electrical (direct) currents, such as busbars, operating in the vicinity of the Coriolis mass flow meter, and/or, as also indicated in FIGS. 4b and 5b, a magnet, for example an electromagnet or a permanent magnet, positioned in the vicinity of the Coriolis mass flow meter in question. In the case of plunger coils as vibration sensors, the aforementioned internal magnetic field H0 is in each case substantially determined by their respective permanent magnets, and the aforementioned change behavior of the magnetic flux is substantially defined by the movements of the respective permanent magnet in the associated air gap, corresponding to the vibration movements of the at least one vibration element, and the external magnetic field H1 can result in at least one of the aforementioned flux densities (B1 and B2) of the respective magnetic flux $\Phi1$ and $\Phi2$ corresponding to the internal magnetic field being changed (B1→B1'=B1+$\Delta$B1, B1→B2'=B2+$\Delta$B2). Such an undesirable influence on the first and/or second useful component $s1_N$, $s2_N$ and impairment of the functionality of the sensor assembly by an external magnetic field (H1) can for example also consist of that, as also indicated in FIG. 3, at least one of the useful components contains an additional interference component ($S1_{N,\ Err}$, $S2_{N,\ Err}$) of equal frequency, such that the aforementioned phase angle of said useful component, and therefore also the aforementioned phase difference $\Delta\varphi12$ ($\Delta\Phi12\rightarrow\Delta\Phi12_{Err}$) then has a phase error, specifically a fraction dependent on the external magnetic field and the influence thereof on the magnetic flux ultimately established in the respective vibration sensor; this is the case for example also such that the integrity of at least one of the vibration measurement signals or of the mass flow measurement values is unacceptably reduced, or that said phase error drives a measurement accuracy, with which the transformer circuit US determines the mass flow measurement values, out of a tolerance range specified for the Coriolis mass flow meter. The presence of the aforementioned external magnetic field H1 also especially results in the magnetic field established within each of the vibration sensors 51, 52 deviating even more from the ideal homogeneous distribution than already in the case without interference (H0), specifically during the aforementioned calibration of the Coriolis mass flow meter or without an external magnetic field H1. As a result, as can easily be seen by viewing FIGS. 6a and 6b together, when an external magnetic field H1 is present, at least one of the harmonic components generally has an amplitude $U1_{N1}$ and $U2_{N1}$, which is higher than in the aforementioned case without interference.

To allow the most prompt detection possible of an external magnetic field H1 impairing the functionality of the sensor assembly and/or an increased measurement error, for example specifically outside a specification of the Coriolis flow meter, attributable to the influence of such an external magnetic field H1, the transformer circuit of the Coriolis mass flow meter according to the invention is therefore also configured to determine, on the basis of the vibration measurement signals, in addition to the mass flow measurement values, at least occasionally one or more characteristic number values for at least one sensor characteristic number SK1, such that said sensor characteristic number SK1 characterizes at least one of the first and second harmonic components and/or is dependent on the amplitude $U1_{N2}$, $U2_{N2}$ of at least one of the first and second harmonic components; for example, the following applies to the sensor characteristic number SK1:

$$SK1 = f(U1_{N2}) \tag{3}$$

and/or $$SK1 = f(U2_{N2}) \tag{4}.$$

The sensor characteristic number SK1 can thus correspond, for example, to the amplitude $U1_{N2}$ or else, for example, to the amplitude $U2_{N2}$ and/or can be a characteristic variable derived from said amplitudes, for example specifically also a peak-peak value ($2\cdot U1_{N2}$, $2\cdot U2_{N2}$) and/or an effective value ($\sqrt{2}\cdot U1_{N2}$, $\sqrt{2}\cdot U2_{N2}$) and/or a rectified value ($2/\pi\cdot U1_{N2}$, $2/\pi\cdot U2_{N2}$) of the first and/or the second harmonic component. For example, a characteristic variable that characterizes or quantifies a deviation of at least one of the vibration measurement signals s1, s2, for example specifically their respective voltage $u_{i1}$, $u_{i2}$, from an ideal sine curve, such as a distortion factor, a crest factor or a total harmonic distortion (THD), can accordingly also be used as the sensor characteristic number SK1. According to a further embodiment, the transformer circuit US is therefore further configured to calculate the sensor characteristic number SK1 such that, the sensor characteristic number SK1 represents a distortion factor of one of the vibration measurement signals s1, s2, for example specifically a distortion factor of one of the aforementioned voltages $u_{i1}$, $u_{i2}$, or a sum of the vibration measurement signals s1, s2, for example specifically a sum $u_{i12}$ of the voltages $u_{i1}$, $u_{i2}$, or a crest factor of one of the vibration measurement signals s1, s2, for example specifically a crest factor of one of the aforementioned voltages $u_{i1}$, $u_{i2}$ or of the aforementioned sum, or a total harmonic distortion of one of the vibration measurement signal, for example specifically a total harmonic distortion o one of the voltages $u_{i1}$, $u_{i2}$ or of the aforementioned sum, or that the sensor characteristic number represents, for example, the greatest one, in terms of amount, of characteristic variables calculated in pairs for the vibration measurement signals s1, s2, and to calculate the sensor characteristic number SK1 on the basis of such a characteristic variable. Accordingly, the sensor characteristic number SK1 can be determined by means of the transformer circuit US according to one of the calculation rules:

$$SK1 \to \sqrt{\frac{-U1_{N1}^2 + \sum_{j=1}^{M} U1_{Nj}^2}{\sum_{j=1}^{M} U1_{Nj}^2}} \quad (M \geq 2) \tag{5}$$

$$SK1 \to \sqrt{\frac{-U2_{N1}^2 + \sum_{j=1}^{M} U2_{Nj}^2}{\sum_{j=1}^{M} U2_{Nj}^2}} \quad (M \geq 2) \tag{6}$$

$$SK1 \to \sqrt{\frac{U2_{N2}^2}{\sum_{j=1}^{M} U2_{Nj}^2}} \quad (M \geq 2) \tag{7}$$

$$SK1 \to \text{Max}\left(\sqrt{\frac{-U1_{N1}^2 + \sum_{j=1}^{M} U1_{Nj}^2}{\sum_{j=1}^{M} U1_{Nj}^2}}, \sqrt{\frac{-U2_{N1}^2 + \sum_{j=1}^{M} U2_{Nj}^2}{\sum_{j=1}^{M} U2_{Nj}^2}}\right) \quad (M \geq 2) \tag{8}$$

$$SK1 \to \text{Max}\left(\frac{-U1_{N1}^2 + \sum_{j=1}^{M} U1_{Nj}^2}{\sum_{j=1}^{M} U1_{Nj}^2}, \frac{-U2_{N1}^2 + \sum_{j=1}^{M} U2_{Nj}^2}{\sum_{j=1}^{M} U2_{Nj}^2}\right) \quad (M \geq 2) \tag{9}$$

$$SK1 \to \frac{\sum_{j=2}^{M} U1_{Nj}^2}{U1_{N1}^2} \quad (M \geq 2) \tag{10}$$

$$SK1 \to \frac{\sum_{j=2}^{M} U2_{Nj}^2}{U2_{N1}^2} \quad (M \geq 2) \tag{11}$$

$$SK1 \to \text{Max}\left(\frac{\sum_{j=2}^{M} U1_{Nj}^2}{U1_{N1}^2}, \frac{\sum_{j=2}^{M} U2_{Nj}^2}{U2_{N1}^2}\right) \quad (M \geq 2). \tag{12}$$

The characteristic number values for at least one sensor characteristic number SK1 can be determined recurrently during operation of the Coriolis mass flow meter by means of the transformer circuit US on the basis of digital amplitude values that are determined in any case for the amplitudes $U1_N$, $U2_N$, $U1_{N2}$, $U2_{N2}$, for example specifically also using the aforementioned useful component sequences $U1_{N1}$[m] and $U2_{N1}$[n] and harmonic component sequences $U1_{N2}$[k] and $U2_{N2}$[l]. It has furthermore been found that it may well be sufficient for a timely detection for the external magnetic field H1 if a characteristic number value update rate, specifically an update rate with which characteristic number values for at least one sensor characteristic number SK1 are ascertained, is set to not less than 1% of the aforementioned measurement value update rate. Conversely, it has also been found that the aforementioned update rates $f_{s1}$, $f_{s2}$, $f_{s3}$ and $f_{s4}$ for determining the useful and harmonic component sequences $U1_{N1}$[m], $U2_{N1}$[n], $U1_{N2}$[k] and $U2_{N2}$[l], and therefore also the characteristic number value update rate can easily be selected such that they are in each case approximately $1/10 \text{ s}^{-1}$, but no less than $1/60 \text{ s}^{-1}$, and therefore an amplitude value $U1_{N1}$[m], $U2_{N1}$[n], $U1_{N2}$[k] and $U2_{N2}$[l] and also a characteristic number value can easily be determined at least once per minute.

In order to detect the presence of an external magnetic field that impairs the functionality of the sensor assembly and therefore the measurement accuracy of the Coriolis mass flow meter, the transformer circuit US in a further embodiment of the invention is also configured to evaluate one or more characteristic number values for the at least one sensor characteristic number SK1, for example specifically to compare them in each case with one or more reference values $BK1_1$ ($BK1_1$, $BK1_2$, ... $BK1_i$, ... ) determined previously for said sensor characteristic number and for example specifically stored in the aforementioned non-volatile electronic data memory EEPROM. Accordingly, the transformer circuit US is also configured to determine whether one or more characteristic number values for the sensor characteristic number SK1 are greater than one or more such reference values for the sensor characteristic number SK1, for example specifically representing a Coriolis mass flow meter that is no longer intact, and possible also to output an (interference) message indicating this, for example specifically to display it on site and/or to transmit it as a status message to the aforementioned electronic data processing system, and/or, for example, also to output no mass flow measurement values. The aforementioned reference values for the sensor characteristic number SK1 can be, for example, reference values representing a reduced functionality (attributable to an external magnetic field) of the sensor assembly or a malfunction (attributable to an external magnetic field) of the sensor assembly. According to a further embodiment of the invention, the transformer circuit is especially configured to compare one or more characteristic number values for the sensor characteristic number SK1 with at least one reference value ascertained therefor and representing the aforementioned phase error attributable to the external magnetic field H1. Said reference values can be ascertained, for example, in advance, for example by the manufacturer of the Coriolis mass flow meter or during (factory) calibration carried out during the production of the Coriolis mass flow meter and/or during commissioning on site and/or during operation of the Coriolis mass flow meter; this is done, for example, such that first the respective sensor characteristic number SK1 is determined for the finished and therefore still intact Coriolis mass flow meter and is converted into the reference value $BK1_1$ with a tolerance value corresponding to a tolerable influence and/or by determining the sensor characteristic number SK1 directly by means of the Coriolis mass flow meter being positioned in the vicinity of a magnet that causes a reference magnetic field but being otherwise intact and storing it as a reference value $BK1_1$ in the data memory EEPROM. For the aforementioned case in which the sensor characteristic number SK1 represents a distortion factor, the associated at least one reference value BK1₁ can for example be selected such that it corresponds to a logarithmic distortion attenuation measure of 60 db (decibels) and is therefore 0.1%.

The determination of the characteristic number values or the determination of the presence of an external magnetic field can be initiated or suspended, for example, in an automated manner, for example specifically in a time-controlled manner and/or also as a function of changes in other diagnostic values. Alternatively or in addition, however, the determination of the characteristic number values can also be initiated and/or suspended from outside the Coriolis mass flow meter, for example from the aforementioned electronic data processing system via the aforementioned transmitting and receiving electronics COM and/or from operating personnel on site via the aforementioned display and operating element HMI. Accordingly, the transformer circuit according to a further is configured to receive and evaluate a start command that initiates at least the determination of the characteristic number values for the sensor characteristic number SK1, possibly specifically also the aforementioned evaluation thereof, specifically to detect an input of the start command and then to start determination of the characteristic number values for the first sensor characteristic number SK1, and/or the transformer circuit is configured to receive and evaluation a stop command that at least temporarily suspends the determination of the characteristic number values for the sensor characteristic number SK1, specifically to detect an input of the stop command and then at least temporarily stop determination of the characteristic number values for the first sensor characteristic number SK1.

The invention claimed is:

1. A Coriolis mass flow meter for measuring a mass flow and density of a fluid to be measured, wherein the fluid is a gas, a liquid or a dispersion, the flow meter comprising:
a measuring transducer including at least one vibration element, an exciter assembly, and a sensor assembly, the measuring transducer configured to conduct the fluid to be measured such that the fluid flows through the measuring transducer at least temporarily; and
an electronic transformer circuit that is electrically coupled to the measuring transducer, including to both the exciter assembly and the sensor assembly, the transformer circuit including at least one microprocessor,
wherein the at least one vibration element is configured to be contacted by the flowing fluid to be measured and to be vibrated at the same time,
wherein the exciter assembly is configured to convert electrical power fed to the exciter assembly into mechanical power that produces forced mechanical vibrations of the at least one vibration element,
wherein the transformer circuit is configured to generate an electrical driver signal and to feed electric power to the exciter assembly via the driver signal such that the at least one vibration element produces forced mechanical vibrations at a vibration frequency, which is determined by the driver signal such that the forced mechanical vibrations generate Coriolis forces based on the mass flow of the flowing fluid to be measured,
wherein to detect the forced mechanical vibrations of the at least one vibration element, the sensor assembly includes an electrodynamic first vibration sensor and an electrodynamic second vibration sensor structurally identical to the first vibration sensor, wherein the first vibration sensor is configured to convert vibration movements of the at least one vibration element at a first measurement point into an electrical first vibration measurement signal such that the first vibration measurement signal includes:
a first signal component, which is an alternating current voltage component at a frequency corresponding to the vibration frequency with an amplitude dependent on the vibration frequency and a first magnetic flux through the first vibration sensor; and
a first harmonic component, which is an alternating current voltage component at a frequency corresponding to a whole-number multiple of the vibration frequency with an amplitude dependent on the first magnetic flux,
wherein the second vibration sensor is configured to convert vibration movements of the at least one vibration element at a second measurement point remote from the first measurement point into an electrical second vibration measurement signal such that the second vibration measurement signal includes:
a second signal component, which is an alternating current voltage component at a frequency corresponding to the vibration frequency with an amplitude dependent on the vibration frequency and a second magnetic flux through the second vibration sensor; and
a second harmonic component, which is an alternating current voltage component at a frequency corresponding to a whole-number multiple of the vibration frequency with an amplitude dependent on the second magnetic flux, and
wherein the transformer circuit is configured to receive and evaluate the first and second vibration measurement signals and to:
determine and output mass flow measurement values representing the mass flow of the fluid based on the first and second vibration measurement signals; and
determine characteristic number values of a sensor characteristic number based on at least one of the first and second vibration measurement signals, wherein the sensor characteristic number defines a change behavior of the first and second vibration sensors in the presence of an external magnetic field and depends on the amplitude of at least one of the first and second harmonic components, and
wherein the transformer circuit is further configured to compare one or more characteristic number values of the sensor characteristic number with one or more corresponding reference values for the sensor characteristic number so as to determine whether the one or more characteristic number values are greater than the corresponding one or more reference values and, when the one or more characteristic number values are greater than the corresponding one or more reference values, to at least one of:
output a message indicating that the one or more characteristic number values are greater than the corresponding one or more reference values; and
output no mass flow measurement values.

2. The flow meter of claim 1, wherein the one or more reference values are determined by a manufacturer of the flow meter and/or during manufacturing of the flow meter, wherein the one or more reference values represent a phase error attributable to the external magnetic field.

3. The flow meter of claim 1, wherein:
the transformer circuit is configured to generate, from the first vibration measurement signal, a first signal component sequence of digital amplitude values quantifying the amplitude of the first signal component; and/or the transformer circuit is configured to generate, from the second vibration measurement signal, a second signal component sequence of digital amplitude values quantifying the amplitude of the second signal component.

4. The flow meter of claim 3, wherein:

the transformer circuit is configured to generate, from the first vibration measurement signal, a first harmonic component sequence of digital amplitude values that quantify the amplitude of the first harmonic component; and/or the transformer circuit is configured to generate, from the second vibration measurement signal, a second harmonic component sequence of digital amplitude values that quantify the amplitude of the second harmonic component.

5. The flow meter of claim 4, wherein the transformer circuit is configured to calculate the characteristic number values using both the first and second signal component sequences and at least one of the first and second harmonic component sequences.

6. The flow meter of claim 1, wherein the transformer circuit includes a non-volatile electronic data memory configured to store digital data without an applied operating voltage and configured to store one or more previously determined reference values of the sensor characteristic number.

7. The flow meter of claim 6, wherein one or more reference values, which have been determined in advance by a manufacturer of the flow meter, during production of the Coriolis mass flow meter, and/or during operation of the Coriolis mass flow meter, are stored in the data memory.

8. The flow meter of claim 1, wherein the transformer circuit is configured to determine the mass flow measurement values at an update rate that is not lower than an update rate at which the transformer circuit determines the characteristic number values.

9. The flow meter of claim 1, wherein the transformer circuit is configured to:

receive and evaluate a start command that initiates at least the determination of the characteristic number values, including to detect an input of the start command and then to initiate a determination of the characteristic number values; and/or receive and evaluate a stop command that at least temporarily prevents the determination of the characteristic number values, including to detect an input of the stop command and then at least temporarily stop a determination of the characteristic number values.

10. The flow meter of claim 1, wherein the transformer circuit includes a first analog-to-digital converter for the first vibration measurement signal and a second analog-to-digital converter for the second vibration measurement signal.

11. The flow meter of claim 1, wherein each of the first and second signal components has a phase angle dependent on the mass flow.

12. The flow meter of claim 11, wherein the transformer circuit is configured to calculate the mass flow measurement values based on a phase difference between the first and second signal components.

13. The flow meter of claim 12, wherein the transformer circuit is configured to compare one or more characteristic number values with at least one reference value determined for the sensor characteristic number, wherein the at least one reference value represents a phase error attributable to the external magnetic field, wherein the phase error is a fraction of the phase difference between the first and second signal components dependent on the external magnetic field.

14. The flow meter of claim 1, wherein the first vibration sensor includes a first plunger coil, and the second vibration sensor includes a second plunger coil.

15. The flow meter of claim 1, wherein:

the first vibration sensor includes a first permanent magnet, which is connected mechanically to the at least one vibration element to form the first measurement point, and a first air coil;

the first permanent magnet forms a first air gap conveying the first magnetic flux, and the first air coil is disposed at least partially within the first air gap;

the first permanent magnet and the first air coil are configured to be moved relative to one another by vibration movements of the at least one vibration element and to generate a first induction voltage, which is the first vibration measurement signal;

the second vibration sensor includes a second permanent magnet, which is connected mechanically to the at least one vibration element to form the second measurement point, and a second air coil;

the second permanent magnet forms a second air gap conveying the second magnetic flux, and the second air coil is disposed at least partially within the second air gap; and the second permanent magnet and the second air coil are configured to be moved relative to one another by vibration movements of the at least one vibration element and to generate a second induction voltage, which is the second vibration measurement signal.

16. The flow meter of claim 1, wherein the exciter assembly includes a vibration exciter to excite vibrations of the at least one measurement tube.

17. The flow meter of claim 1, wherein the at least one vibration element includes at least one tube, which is at least partially straight and/or at least partially arcuate, having a lumen defined by a tube wall, wherein the at least one tube is adapted such that the fluid to be measured flows therethrough while at least one tube is caused to vibrate.

18. The flow meter of claim 1, wherein the characteristic number values are at least one of:

a peak value of the first and/or second harmonic component;

an effective value of the first and/or second harmonic component;

a rectified value of the first and/or second harmonic component; and a peak-to-peak displacement of the first and/or second harmonic component.

19. The flow meter of claim 1, wherein the characteristic number values are determined such that the sensor characteristic number represents:

a crest factor of one of the first and second vibration measurement signals;

a crest factor of a sum of the first and second vibration measurement signals;

a total harmonic distortion of one of the first and second vibration measurement signals; or a total harmonic distortion of a sum of the first and second vibration measurement signals.

\* \* \* \* \*